United States Patent Office 3,845,145
Patented Oct. 29, 1974

3,845,145
PREPARATION OF CHLOROHYDRINS
John A. Wojtowicz, Cheshire, Conn., Milton Lapkin, Barrington, R.I., and Mohindar S. Puar, East Brunswick, N.J., assignors to Olin Corporation
No Drawing. Continuation-in-part of applications Ser. No. 792,761, Jan. 21, 1969, now Patent No. 3,578,400, and Ser. No. 852,907, Aug. 25, 1969, now abandoned. This application July 28, 1972, Ser. No. 276,015
Int. Cl. C07c 31/34, 35/00
U.S. Cl. 260—634                              10 Claims

ABSTRACT OF THE DISCLOSURE

Solutions of hypochlorous acid (HOCl), free from chloride and chlorine, prepared by extraction of aqueous chlorination mixtures containing HOCl and chloride using an extraction solvent selected from the group consisting of lower alkyl ketones, lower alkyl cyanides and lower alkyl esters of lower alkanoic acids, are reacted with unsaturates to form chlorohydrins. The chlorohydrins are separated from the reaction mixture in excellent yields. By-products are formed only in amounts much lower than in previous chlorohydrin-forming processes.

RELATED APPLICATIONS

This application is a continuation-in-part of co-pending U.S. Ser. No. 792,761, filed Jan. 21, 1969, now U.S. Pat. No. 3,578,400, and U.S. Ser. No. 852,907, filed Aug. 25, 1969, now abandoned This invention relates to the preparation of organic chlorohydrins by reacting unsaturated organic compounds with hypochlorous acid solutions in certain organic solvents which are substantially free from halide ions, such as chloride ions. The preparation of said hypochlorous acid solutions is more fully described in the specification of the parent application identified above and said parent application is incorporated herein by this reference.

It is a principal object of this invention to provide a process for the efficient and economical production of chlorohydrins in high yields accompanied by greatly reduced proportions of the usual by-products of chlorohydrin-forming reactions.

Hypochlorous acid, usually in the form of its aqueous solutions, is employed in a relatively large number of chemical and industrial processes. For example, in the production of organic chlorohydrins, a hypochlorous acid solution is interacted with unsaturated organic compounds, which include the olefins, such as ethylene, propylene, butylenes, amylenes and the like, members of the acetylene series as acetylene, propyne, butyne, and their homologues, diolefins, such as allene, butadiene, isoprene, alcohols as allyl alcohol and cinnamyl alcohol, aldehydes and ketones as acrolein and mesityl oxide, esters as allyl acetate, ethers as allyl ether, halides as vinyl chloride, allyl bromide, allyl chloride, methallyl chloride, acetylene dichloride, and the like, and their homologues and analogoues. These unsaturated organic compounds more particularly include as olefinically unsaturated organic compounds, selected from the group consisting of olefins, olefinic halides, mono-hydroxy substituted olefins and cyclic olefins, for example, cyclohexene and cyclododecene, especially the olefinic compounds, both olefinc hydrocarbons and substituted olefinic compounds, for example, styrene and dichlorostyrene which are suitable for use according to the present invention.

One of the common methods of synthesis of a hypohalous acid solution includes the reaction between water and a halogen. For instance, the production of hypochlorous acid by the reaction of chlorine and water follows the equation:

$$H_2O + Cl_2 \rightarrow HOCl + HCl$$

In order to neutralize the hydrochloric acid formed as a result of the aforementioned reaction, it is customary to employ an alkali, such as sodium or calcium hydroxide, or the like. The addition of such alkali neutralizes the hydrochloric acid, but simultaneously forms an inorganic halide, which, in most cases, is water-soluble, thus forming an aqueous hypochlorous acid solution containing a greater or lesser concentration of halide ions. The presence of this inorganic halide in the hypochlorous acid solution is highly undesirable when the hypochlorous acid is employed for the chlorohydrination of unsaturated organic compounds of the classes defined hereinabove. The presence of halide ions tends to form undesirable by-products of the type of organic halides or polyhalides, when such hypochlorous acid solutions are employed as one of the reactants in the abovementioned chlorohydrination reactions. For instance, when allyl chloride is intimately commingled with an aqueous hypochlorous acid solution containing such free chloride ions, the reaction products contain excessive quantities of organic chlorides of the type of trichloropropane and tetrachloropropyl ether. Similarly, the reaction between ethylene and these chloride ioncontaining aqueous solutions of hypochlorous acid, instead of producing quantitative yields of ethylene chlorohydrin, also results in the formation of ethylene dichloride. In fact, even when the chlorohydrination of unsaturated organic compounds with such aqueous hypochlorous acid solutions containing halide ions is effected under the most optimum conditions, the reaction products still contain relatively high percentages of organic halides.

It is known in the art that aqueous hypochlorous solutions can be separated from associated materials by extraction. However, the known methods generally do not form true solutions. The polyhalogenated aliphatics which are mentioned as suitable solvents extract only trace amounts of hypochlorous acid from aqueous solutions. The prior art also suggests that the presence of a small amount of alcohol is desirable. It is well known that alcohols react readily with hypochlorous acid to form organic hypochlorites so that extraction of hypochlorous acid in the presence of an alcohol does not lead to hypochlorous acid solutions but rather to solutions of compounds of hypochlorous acids. See, for example, Sandmeyer, Ber., *18*, 1767 (1885); 19, 859 (1886; Taylor *et al.*, J. Am. Chem. Soc., *47*, 395 (1925) and U.S. Pats. 1,481,039; 1,481,040; 1,632,483; 1,632,484; and 1,632,485.

However, certain solvents have now been discovered which extract hypochlorous acid essentially free of chloride without concomitant compound formation. These solvents also have the very important advantage of being chemically stable to hypochlorous acid at low temperatures and having reasonable chemical stabilities at ambient conditions, thereby permitting their use for the intended purposes. These solvents having the unusual and unexpected property of being able to extract hypochlorous acid from aqueous salt solutions to produce organic solutions of hypochlorous acid essentially free of chloride ion are selected from the group consisting of lower alkyl ketones, lower alkyl cyanides and lower alkyl esters of lower alkanoic acids where said lower alkyl contains from 1 to 5 carbon inclusive. Example of useful solvents include acetone, methyl ethyl ketone, methyl isobutyl ketone, diethyl ketone, di-n-propyl ketone, acetonitrile (methyl cyanide), propionitrile (ethyl cyanide), methyl acetate, ethyl acetate and methyl propionate.

It has further been discovered that the extractions need not be conducted as a separate step, since the solvents can also be present during the formation of the hypochlorous acid. The extractant can therefore serve as a co-solvent and remove the hypochlorous acid from the reaction site as it forms. The process thus generally comprises preparing solutions of hypochlorous acid substantially free from chloride by mixing at temperatures of +10° to −30° C. an aqueous solution containing chloride and hypochlorous acid with an extraction solvent selected from the class consisting of lower alkyl ketones, lower alkyl cyanides and lower alkyl esters of lower alkanoic acids and separating the resulting solution of hypochlorous acid in said solvent from the resulting aqueous phase. The product comprises a solution of hypochlorous acid in a solvent selected from the group consisting of lower alkyl ketones, lower alkyl cyanides and lower alkyl esters of lower alkanoic acids. In the present specification and claims the lower alkyl groups are meant to include those having 1 to 5 carbon atoms, inclusive. Also the lower alkanoic acids have 1 to 5 carbon atoms, inclusive.

By varying the water content of the aqueous mixture of base which is chlorinated to produce HOCl and by varying the proportion of extraction solvent, the concentration of HOCl in the solvent is suitably controlled to produce solutions having a concentration of HOCl of from 0.1 molal or less to about 10 molal or more, 0.525 percent to 52.5 percent by weight. Conveniently solutions of about 0.5 to 5 molal are readily prepared, stored and used. These solutions are stable at temperatures below 0° C. and are sufficiently stable for use when stored at ambient temperatures for several days.

In the preparation of aqueous hypochlorous acid for use in the extraction process by chlorination of aqueous alkali, chloride is concomitantly formed in the solution according to the equation above. In a particularly advantageous form of the process, additional chloride is added to the aqueous hypochlorous acid or to the aqueous mixture of alkali to be chlorinated. The additional chloride lowers the freezing point of the aqueous phase and facilitates the chlorination and extraction at lower temperatures. Advantageously, though not necessarily, the chlorinations are carried out in the range of about 0° to −30° C. The extractions are suitably carried out at temperatures of about +10° to −30° C. since the stability of the HOCl in the aqueous chloride solution before extraction is somewhat less than in the organic solution after extraction.

Alkalies suitable for use in chlorination to form the aqueous chloride-containing solution of HOCl to be extracted are suitably any alkali which with chlorine forms HOCl. More particularly useful are the alkaline compounds of the alkali metals and alkaline earth metals. Their oxides, hydroxides and carbonates are suitable including specifically sodium hydroxide, potassium hydroxide, sodium carbonate, calcium oxide, calcium hydroxide and calcium carbonate. Other alkaline compounds of the alkali metals and alkaline earth metals are also suitable.

While chlorintion of alkalies, as described, is cheap and convenient for the preparation of aqueous solutions of HOCl, the solutions to be extracted are suitably prepared by any other known methods.

The process of the present invention utilizes the substantially chloride-free hypochlorous acid solutions prepared as described above and, with special advantage the solutions in methyl ethyl ketone (MEK). The MEK solutions suitably contain from 0.5 to 50 percent by weight of HOCl and minor amounts of water, from 0.1 up to about 5 percent. The unsaturate is mixed with the HOCl solution in any suitable manner depending on its physical state. Liquids are added directly or are suitably diluted in solution in a solvent. With especial advantage the solvent is the same as selected for dissolving the HOCl. Methyl ethyl ketone is a suitable solvent for the unsaturate when methyl ethyl ketone is the solvent for the HOCl. Gaseous unsaturates are appropriately passed as gases through the HOCl solution or they may be previously dissolved advantageously using the same solvent as selected for dissolving the HOCl. Solid unsaturates are generally dissolved before adding to the HOCl solution.

The order of addition is not critical and the HOCl solution is suitably added to the unsaturate, diluted or not, or both are introduced into a suitable reaction zone. The process can be carried out batchwise or continuously.

The reaction temperature is not critical but the reaction is preferably carried out at temperatures of about −25° to 60° C. Better yields with lower by-product formation are obtained at temperatures of about 0° to 50° C. and this temperature range is preferred.

Advantageously a stoichiometric excess of HOCl to unsaturate is utilized in the reaction to obtain high yields of chlorohydrin based on the unsaturate. However, where the unsaturate is cheap, it is advantageous to use a stoichiometric excess of the unsaturate to insure conversion of all of the HOCl. Ethylene and propylene are so cheap that it is more economical to use them in excess. Dodecene and octadecene, however, are more expensive and preferably an excess of HOCl is used in forming their chlorohydrins.

It is a particular advantage of the present invention that higher olefins and other water-insoluble unsaturates are converted quickly and in good yields to their chlorohydrins using HOCl dissolved in the recited solvents. The solvents dissolve the water-insoluble unsaturates sufficiently to enhance reaction rates and yields. In contrast, reaction of water-insoluble unsaturates with aqueous solutions of HOCl is slow, incomplete and frequently ineffective.

Most of the reaction occurs in a few minutes at these temperatures but the reaction mixture is advantageously maintained at reaction temperaures for a post-reaction period of up to an hour or more to insure complete reaction. The product is separated from the reaction mixture in any suitable manner, for example, by distillation, evaporation or crystallization as appropriate. Yields are usually 90 percent or better.

A further particular advantage of the present invention is that the HOCl solutions, used as reagent and prepared as described above by extraction from aqueous HOCl solutions, contain from 0.1 to 5 percent water. The water content significantly reduces by-product ether formation in the reaction of HOCl with unsaturates. To this end, it is advantageous to incorporate further amounts of water in the reaction mixture and the total amount of water suitably is from 0.1 to 2.5 percent in the reaction mixture. However, to avoid unnecessary dilution of the chlorohydrin product, it is preferable that the weight of water be in the range of 5 to 15 percent. It is further preferred to avoid the separation of more than a minor amount of a second phase and to maintain a substantially homogeneous reaction mixture since yields of the chlorohydrins tend to be reduced and yields of by-products increased in the presence of a second phase. For this reason, excessive amounts of water, above 25 percent, are preferably avoided.

EXAMPLE I

Excess propylene was bubbled through 44 g. methyl ethyl ketone (MEK) saturated with water at 45° C. while 151 g. of a cold (−20° C.) MEK solution of HOCl (1.32 molal; 198 millimoles) was added dropwise over a 45 minute period. After a 30 minute post-reaction period to allow for complete reaction of HOCl, the small amount of aqueous layer was saturated with NaCl and extracted with MEK. The combined organic layers were analyzed by gas-liquid chromatography (g.l.c.). The product distribution and yields based on propylene consumed in this and other similar runs are given in Table I.

TABLE I

| Run number | Temp., °C. | HOCl, molality | Yields, percent | | | |
|---|---|---|---|---|---|---|
| | | | PCH | PDC | CIPE | CA |
| 11 | −20–45 | 1.32 | 95.6 | 1.0 | 2.9 | 0.2 |
| 15 | 30–35 | 1.35 | 98.0 | 1.1 | 0.6 | |
| 17 | 30–35 | 2.20 | 94.0 | | 5.5 | |
| 12 | 48–53 | 1.18 | 93.0 | | 4.0 | |
| 18 | 0 | 1.67 | 91.0 | 1.9 | 7.5 | |

NOTE.—PCH=Propylene chlorohydrin; PDC=Propylene dichloride; CIPE=Chloro-isopropyl ether; CA=Chloroactone.

EXAMPLE II

Propylene Chlorohydrin

Propylene and a cold solution of HOCl in MEK (49.5 g.; 137.6 millimoles of HOCl) were added over a 30 minute period to 55.8 g. of MEK saturated with water at 35° to 40° C. Analysis showed the following yields of products:

| Run number | Weight percent PCH | Yields, percent | | | |
|---|---|---|---|---|---|
| | | PCH | PDC | ClPE | CA |
| 21 | 4.8 | 97.2 | 1.2 | 1.2 | 0.4 |
| 22 | 11 | 93.6 | 1.6 | 4.2 | 0.6 |
| 23 | 16.8 | 88.1 | 2.9 | 8.2 | 0.8 |

EXAMPLE III

(A) Propylene Chlorohydrin

Separate streams of propylene (12 millimoles/min.) H$_2$O (0.5 g./min.) and cold bicarbonate-washed MEK solution of HOCl (440 g.; 1.45 molal; 634 millimoles, 4.5–5 g./min.) were introduced by flow meters into a stirred flow reactor (volume 225 ml.) at 40° C. for 92 minutes. The reaction mixture weighed 512 g. and contained an aqueous phase of 20 g. Analysis showed the following products and yields based on propylene consumed:

Product: Percent yield
PCH ---------------------------------- 93.9
PDC ---------------------------------- 0.9
ClPE ---------------------------------- 5.4
CA ---------------------------------- 0.1

The concentration of PCH in the mixture was 11.7 percent

(B) Hydrochlorination in Aqueous Acetone

For comparison, chlorine (59 g.; 0.83 mole) and propylene (about 10 percent excess over the chlorine) were bubbled into a well stirred solution of water (400 cc.) and acetone (400 cc.). Reaction time was 2 hours; maximum temperature was 25° C. Analysis of the reaction mixture showed the following products and yields:

Product: Percent yield
PCH ---------------------------------- 84.3
PDC ---------------------------------- 10.1
ClPE ---------------------------------- 1.9

The concentration of PCH in the mixture was 8.7 percent. In contrast, the yield in Example III(A) was 93.9 percent and the concentration of PCH was higher showing the advantageous results of the method of the invention compared to methods using more water. In water alone as the reaction medium in the absence of any organic solvent even lower yields of the desired PCH and the higher yields of the unwanted PDC are obtained.

EXAMPLE IV

Dodecene Chlorohydrin

Commercial alpha-dodecene (8.4 g.; 94.1 percent assay; 47 millimoles) was stirred at 47° C. with 2 g. H$_2$O while 42 g. of a cold MEK solution of HOCl (1.49 molal; 62.6 millimoles) was added. Chromatographic analysis showed the following products and yields based on dodecene:

Product: Percent yield
Dodecene chlorohydrin ---------------- 96.3
Dodecene dichloride ------------------- 3.7

MEK was stripped off to obtain the chlorohydrin.

EXAMPLE V

Octadecene Chlorohydrin

Alpha-octadecene (12.6 g.; 91.8 percent assay; 46 millimoles) was stirred at 47° C. with 2 g. H$_2$O while 42 g. of a cold MEK solution of HOCl (1.49 molal; 62.5 millimoles) was added over a 50 minute period. Chromatographic analysis showed the following products and yields based on octadecene uncorrected for unreacted olefin:

Product: Percent yield
Octadecene chlorohydrin -------------- 90.3
Octadecene dichloride ---------------- 6.5

EXAMPLE VI

Dichloropropanol

A cold solution of HOCl in MEK (103.6 g.; 2.80 molal; 290 millimoles) was added dropwise over a 40 minute period to a well-stirred mixture of allyl chloride (24.2 g.; 316 millimoles) and water (15 g.). Reaction temperature was maintained between 12° and 19° C. by external cooling. The organic layer weighed 14.9 g. Chromatographic analysis showed the following product distribution and yields based on allyl chloride:

Product: Percent yield
Dichloropropanol ---------------------- 86.7
Bis (2,3-dichloropropyl) ether -------- 9.8
1,2,3-trichloropropane ---------------- 3.5

EXAMPLE VII

Glycerine Chlorohydrins

Allyl alcohol (6.99 g.; 99 percent assay; 119 millimoles) was added dropwise to 13.8 g. H$_2$O (stirred magnetically) along with 45.1 g. of a cold MEK solution of HOCl (119 millimoles) over a period of 10 minutes. Reaction temperature varied between 27° and 52° C. Reaction mixture was homogeneous. Analysis showed the following products and yields based on allyl alcohol.

Product: Yield percent
Glycerol chlorohydrins ---------------- 87.5
2,3-dichloropropanol ------------------ 3.9
Bis-chlorohydroxypropyl ether --------- 4.9
Ketals --------------------------------- 1.4

EXAMPLE VIII

Cyclododecene Chlorohydrin

Cyclododecene (8.3 g.; 91 percent assay; 45.5 millimoles) was stirred with 2 g. H$_2$O at 47° C. while 22 g. of a cold MEK solution of HOCl (2.79 molal; 61 millimoles) was added over a 30 minute period. After an additional 1.5 hours at 50° C., analysis showed a satisfactory yield of cyclododecene chlorohydrin.

EXAMPLE IX

Propylene Chlorohydrin

Propylene was passed at a rate of 6 millimoles per minute into 6 cc. of water at 0° C. while a cold diethyl ketone (DEK) solution of HOCl (1.15 molal; 22.0 g.) was added during a period of 15 minutes. After a post-reaction period of one hour, the reaction mixture was analysed and showed the following products and yields:

Product: Percent yield
Propylene chlorohydrin --------------- 90+
Chloro-isopropyl ether ---------------- 1.3
Chloroacetone ------------------------- 0.2
2,3-dichloropropanol ------------------ 0.5

EXAMPLE X

(A) Butylene Chlorohydrin

Butylene (15.0 g.) and a cold solution of HOCl in MEK (98.8 g. of solution; 152 millimoles of HOCl) were added over a 45 minute period to a well-stirred solution of saturated aqueous MEK (200.7 g.). Analysis showed the following yields of products:

| Product: | Percent yield |
|---|---|
| Butylene chlorohydrin | 91.7 |
| Butylene dichloride | 3.8 |
| Bis-chlorobutyl ether | 1.1 |

(B) Aqueous Hypochlorination of Butylene

Chlorine (20.5 g., 0.29 mole) and butylene (20.6 g.; 0.368 mole) were bubbled into water (750 g.) using rapid stirring. Reaction time was 63 minutes and maximum reaction temperature was 45° C. Some organic layer separated after standing. Analysis showed the following yields:

| Product: | Yield percent |
|---|---|
| Butylene chlorohydrin | 57 |
| Butylene dichloride | 5.5 |
| Bis-chlorobutyl ether | 3.3 |

The remainder included various oxidation and polychlorination products.

EXAMPLE XI

Cyclohexene Chlorohydrin

Hypochlorination of cyclohexene (16.5 g.; 0.2 mole) in 10 g. $H_2O$ with 141 g. of MEK solution containing 0.2 mole of HOCl was rapid and exothermic. Maximum temperature was 60° C. Analysis of the stripped crude product indicated about 90 percent yield of trans-2-chlorocyclohexanol and a small amount of the cis isomer with minor amounts of trans-dichlorocyclohexane.

EXAMPLE XII

A stream of propylene was sparged at a rate of 1 gram per minute into 150 ml. of stirred ethyl acetate saturated with water. A cold solution of HOCl in ethyl acetate amounting to 403 grams and containing 302 millimols of HOCl, prepared as described in U.S. Pat. 3,578,400 was added. After standing overnight, a small amount of aqueous phase was separated and extracted with ethyl acetate. The combined organic layers were concentrated by distillation to obtain 204.4 grams of product. Chromatographic analysis showed the following yields based on propylene reacted:

| Product: | Yield percent |
|---|---|
| Propylene dichloride | 2.4 |
| Propylene chlorohydrin | 92.2 |
| Bis(2-chloropropyl) ether | 5.6 |

EXAMPLE XIII

To 50 grams of 2:1 (by weight) mixture of propionitrile and water, stirred and sparged with propylene was added 165 grams fo a 1.705 molal HOCl solution in propionitrile, prepared as described in U.S. Pat. 3,578,400. After standing overnight, a small amount of aqueous phase was separated and extracted with propionitrile. Analysis of the combined organic layers showed the presence of 150 millimoles of propylene chlorohydrin and 2.3 millimoles of chloroisopropyl ether. The propionitrile interfered with analysis for propylene dichloride.

What is claimed is:

1. In a process for preparing chlorohydrins by reacting hypochlorous acid with an unsaturated organic compound having from 2 to about 20 carbon atoms selected from the group consisting of olefins, cyclic olefins, monohydroxy substituted olefins and olefinic halides to form a reaction mixture containing the resulting chlorohydrins and separating said chlorohydrins from said reaction mixture, the improvement which comprises:
  (a) reacting said unsaturated organic compound at temperatures of −25 to +60° C.,
  (b) with a solution of hypochlorous acid dissolved in an organic solvent selected from the group consisting of,
    (1) lower alkyl ketones,
    (2) lower alkyl cyanides,
    (3) lower alkyl esters of lower alkanoic acids, wherein each of said lower alkyls contain from 1 to 5 carbon atoms,
      (i) said solution of hypochlorous acid being essentially free of chloride ions and being obtained by extracting hypochlorous acid from a hypochlorous acid reaction mixture with said organic solvent,
  (c) said solution of hypochlorous acid containing from about 0.5 to 50 percent by weight of hypochlorous acid, and
  (d) said reaction mixture containing the resulting chlorohydrins containing from 0.1 to 25 percent by weight of water.

2. The process of claim 1 wherein said hypochlorous acid reaction mixture is produced by chlorinating an aqueous solution of oxides, hydroxides or carbonates of an alkali metal or an alkaline earth metal at temperatures from 10° to −30° C.

3. The process of claim 1 wherein said solvent is a lower alkyl ketone.

4. The process of claim 3 wherein said lower alkyl ketone is methyl ethyl ketone.

5. The process of claim 4 wherein said unsaturated organic compound is gaseous propylene.

6. The process of claim 1 wherein said solvent is a lower alkyl cyanide.

7. The process of claim 6 wherein said lower alkyl cyanide is propionitrile.

8. The process of claim 7 wherein said unsaturated organic compound is propylene.

9. The process of claim 1 wherein said solvent is a lower alkyl ester of a lower alkanoic acid.

10. The process of claim 9 wherein said lower alkyl ester of a lower alkanoic acid is ethyl acetate.

References Cited

UNITED STATES PATENTS

| 2,856,417 | 10/1958 | Wijga | 260—634 X |
| 3,578,400 | 5/1971 | Wojtowicz | 23—152 |
| 2,714,121 | 7/1955 | Anderson et al. | 260—633 |
| 1,394,664 | 10/1921 | Brooks | 260—634 |
| 2,456,350 | 10/1948 | Weizmann | 260—634 |
| 1,477,113 | 12/1923 | Essex et al. | 260—633 |
| 1,594,879 | 8/1926 | Essex et al. | 260—633 |
| 1,873,072 | 8/1932 | Tressler | 260—633 |
| 3,277,189 | 10/1966 | Bromberg | 260—634 |
| 3,285,976 | 11/1966 | Wegaer | 260—634 |
| 3,598,874 | 2/1971 | Kloss et al. | 260—634 |

OTHER REFERENCES

Chapin: J.A.C.S., 56 (1934), 2211–2215.

HOWARD T. MARS, Primary Examiner

U.S. Cl. X.R.

260—488 L, 594, 602, 617 R, M, 618 D, 631 R, 633